United States Patent [19]
Yoshioka et al.

[11] Patent Number: 5,560,339
[45] Date of Patent: Oct. 1, 1996

[54] FUEL INJECTION CONTROL SYSTEM FOR INTERNAL COMBUSTION ENGINE

[75] Inventors: Yoshiaki Yoshioka, Sagamihara; Hatsuo Nagaishi, Yokohama, both of Japan

[73] Assignee: Nissan Motor Co., Ltd., Yokohama, Japan

[21] Appl. No.: 292,144

[22] Filed: Aug. 18, 1994

[30] Foreign Application Priority Data

Sep. 27, 1993 [JP] Japan .................................. 5-239780

[51] Int. Cl.$^6$ .................................................. F02M 51/00
[52] U.S. Cl. ............................................................ 123/478
[58] Field of Search ................................. 123/478, 682; 364/431.05

[56] References Cited

U.S. PATENT DOCUMENTS

| | | | |
|---|---|---|---|
| 5,191,531 | 3/1993 | Kurosu et al. | 364/431.05 |
| 5,209,205 | 5/1993 | Auracher et al. | 123/478 |
| 5,263,455 | 11/1993 | Iwai et al. | 123/478 |
| 5,347,974 | 9/1994 | Togai et al. | 123/682 |
| 5,367,462 | 11/1994 | Klenk et al. | 364/431.05 |
| 5,404,856 | 4/1995 | Servati | 123/478 |
| 5,408,972 | 4/1995 | Servati | 123/478 |

FOREIGN PATENT DOCUMENTS 4-224255   8/1992   Japan .................................. 123/478

*Primary Examiner*—Raymond A. Nelli
*Attorney, Agent, or Firm*—Lowe, Price, LeBlanc & Becker

[57] ABSTRACT

In a multicylinder internal combustion engine having fuel injection valves for respective cylinders, an improved fuel injection control system includes a first device for detecting the amount of air fed to each cylinder and a second device for calculating a basic fuel injection amount at given intervals on the basis of the detected quantity of state, for weighting the basic fuel injection amount at the given intervals to obtain a substantial fuel injection amount which corresponds to the amount of air fed to the cylinder, and for correcting the substantial fuel injection amount on the basis of a given rate of a variation between the basic fuel injection amount and the substantial fuel injection amount thereby to obtain a final fuel injection amount. The control system also includes a third device for driving each of the injection valves on the basis of the final fuel injection amount.

8 Claims, 3 Drawing Sheets

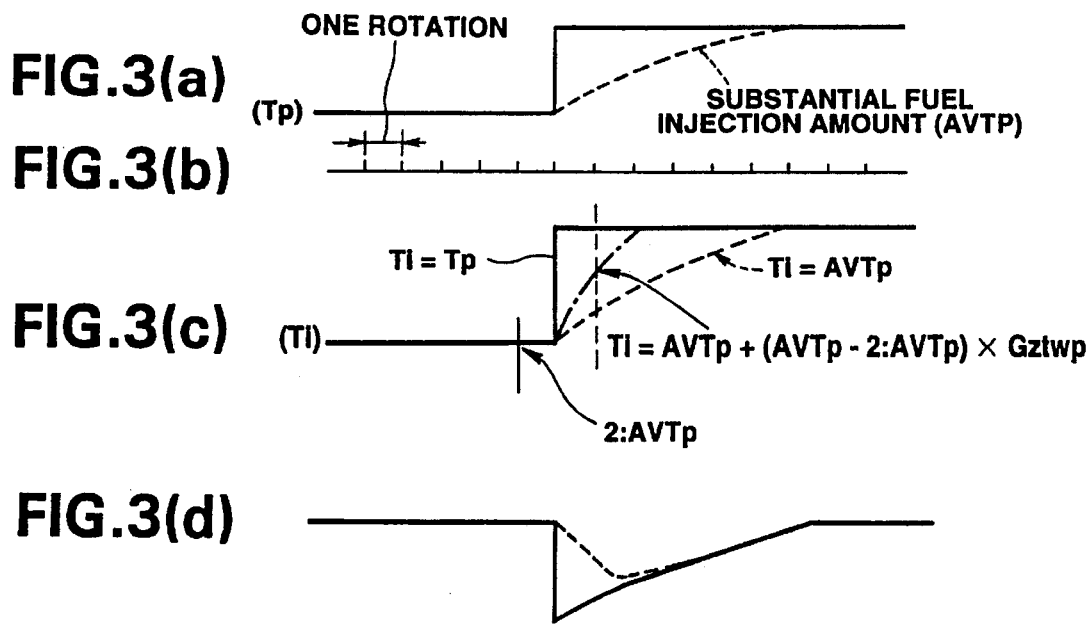

5,560,339

FUEL INJECTION CONTROL SYSTEM FOR INTERNAL COMBUSTION ENGINE

BACKGROUND OF THE INVENTION

1. Field of the Invention

The present invention relates in general to a fuel injection control system for an internal combustion engine, and more particularly to a system for suppressing hunting of the engine under idling operation by controlling the fuel injection.

2. Background of the Related Art

In an internal combustion engine, it tends to occur that under a transient state, the air which has passed through a throttle valve is impeded from making a smooth flow by the interference of the volume of the intake air collecting portion and that of the intake manifold, which are located downstream o the throttle valve, and thus the air flow fails to reach the cylinders smoothly. This phenomenon however brings about a non-negligible difference between the amount of air actually fed to the cylinders and the amount of air measured by an air-flow meter. Of course, under this condition, satisfactory air-fuel ratio control is not obtained in the fuel-injection control system.

In view of such an undesired phenomenon, a measure has been proposed which is used in an air-fuel ratio control system disclosed in Japanese Patent First Provisional Publication 4-224255.

In the system of this publication, a basic fuel injection amount "Tp" (viz., pulse width corresponding to a basic amount of fuel to be injected), calculated on the basis of both the amount of intake air measured by an air-flow meter and the engine speed, is subjected to a weighting process to derive a substantial fuel injection amount which corresponds to the amount of air actually fed to the cylinders.

Furthermore, in the system of the publication, a correction is made to the substantial fuel injection amount in accordance with a change of the same which appears in a time for which a crankshaft of the engine rotates twice or so.

However, due to its inherent construction, the system of the publication tends to have a drawback when applied to internal combustion engines of a type employing a multipoint injection system (viz., MPI) and having an intake manifold of larger volume. As is known, the multi-point injection system is the system in which a fuel injection valve is provided for each cylinder. In the engines of such type, usage of the weighting process for flattening the characteristic of the air-fuel ratio tends to increase the degree of the undesired hunting of the engine at idling.

In a system wherein the weighting process is not employed, under a transient state, the basic fuel injection amount "Tp" fails to be set to a degree corresponding to the amount of air actually fed to the cylinders. That is, during acceleration of the vehicle, the basic fuel injection amount "Tp" is set to a degree greater than the degree which corresponds to the amount of air actually fed to the cylinders. In this case, the fluctuation of the air-fuel ratio is increased. However, when the engine speed drops, the air-fuel ratio is shifted to a richer side, and when the engine speed increases, the air-fuel ratio is shifted to a leaner side, so that the undesired hunting of the engine is suppressed.

In the afore-mentioned system, wherein the weighting process is employed, the fluctuation of the air-fuel ratio can be controlled to be small. However, the hunting suppressing effect is lowered.

Accordingly, hitherto, in the internal combustion engines of the above-mentioned type which employs the multi-point injection system (MPI system) and has the larger intake manifold volume, a measure has been employed in which when a relatively large weighting is needed for setting the substantial fuel injection amount, the weighting degree for a previous degree is set small as compared with a degree at non-idling state in order to obtain the hunting suppressing effect at idling state. With this measure, the hunting suppressing effect and the air-fuel ratio fluctuation reducing effect are both obtained.

As is known, in order to effectively suppress the hunting it is necessary to instantly increase the torque of the engine just at the time when the engine speed drops. However, in the conventional air-fuel ratio control system of the abovementioned type, the instant increase of the engine torque has not been achieved due to their inherent constructions. This will be seen from FIG. 3 of the accompanying drawings. Particularly, the hunting suppressing effect needed under engine idling after the warming up has been unsatisfied.

SUMMARY OF THE INVENTION

It is therefore a principle object of the present invention to provide a fuel injection control system which is free of the above-mentioned drawbacks.

According to the present invention, there is provided a fuel injection control system for an internal multicylinder combustion engine which has individual fuel injection valves for respective engine cylinders. The system comprises first means for detecting the amount of air fed to each cylinder; second means for calculating a basic fuel injection amount at given intervals on the basis of the detected amount of air; third means for weighting the basic fuel injection amount at the given intervals to obtain a substantial fuel injection amount which corresponds to the amount of air; fourth means for correcting the substantial fuel injection amount on the basis of a given rate of a variation between the basic fuel injection amount and the substantial fuel injection amount to thereby obtain a final fuel injection amount; and fifth means for driving each of the injection valves on the basis of the final fuel injection amount to provide a controlled amount of fuel to each of the respective cylinders.

BRIEF DESCRIPTION OF THE DRAWINGS

FIGS. 3(a)–3(d) are a time chart depicting drawbacks possessed by conventional fuel injection control systems.

DETAILED DESCRIPTION OF THE INVENTION

Figure 1:
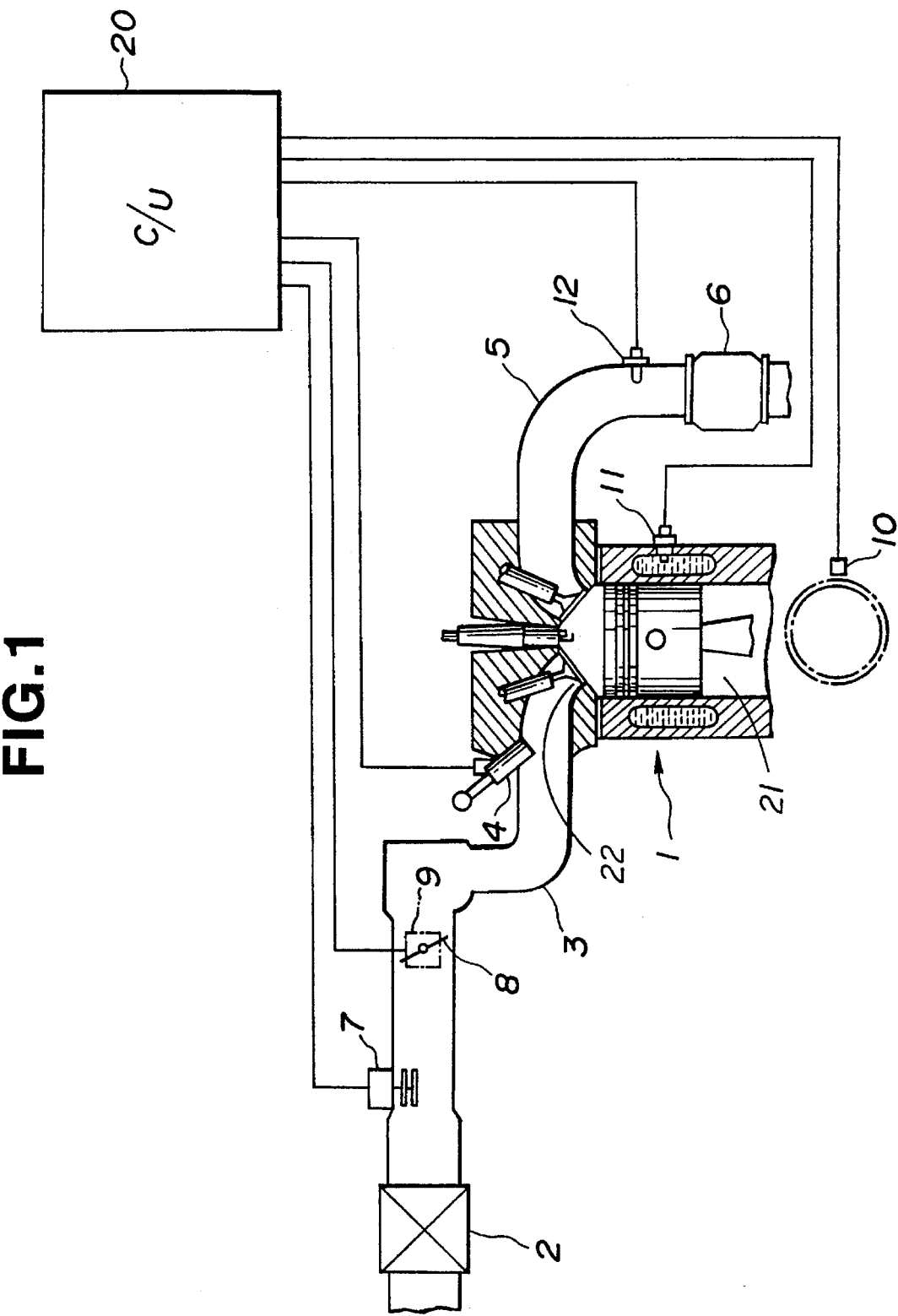
FIG. 1 is a schematic view showing of a fuel injection control system according to a preferred embodiment the present invention.

Referring to FIG. 1 of the drawing, there is shown a fuel injection control system of the present invention, which is applied to a multicylinder internal combustion engine 1.

In the drawing, air cleaner 2 is mounted on an upstream part of an intake tube 3. The intake tube 3 leads to cylinders 21 (only one being shown in longitudinal cross-section in FIG. 1) of the engine 1 through an intake manifold. A fuel injection valve 4 is provided for each cylinder. Thus, a multi-point injection system (MPI) is employed in the engine 1. The fuel injection valve 4 functions to inject a given amount of fuel to the intake port 22 of the corresponding cylinder 21 in response to a fuel injection pulse signal applied thereto.

The sentence 5 is an exhaust tube through which the combustion gas from the cylinders 21 of the engine 1 is led to a three-way catalytic converter 6 and purified by the same. That is, harmful components (CO, HC and NOx) in the combustion gas are made harmless by the converter 6. The harmless combustion gas from the converter 6 is discharged to the open air.

The intake air amount "Qa" is detected by an air flow meter 7 which is mounted on the intake tube downstream off the air cleaner 2. The air flow meter 7 may be of a hot wire type. 8 is a throttle valve which is mounted in the intake tube 3 downstream of the air flow meter 7. The throttle valve 8 controls the amount of intake air fed to the cylinders in accordance with the depression degree of an accelerator pedal (not shown).

The open degree "TVO" of the throttle valve 8 is detected by a throttle sensor 9, and the speed "Ne" of the engine 1 is detected by a crank angle sensor 10. Temperature of cooling water in a water jacket of the engine 1 is detected by a temperature sensor 11. 12 is an oxygen sensor which is mounted in the exhaust tube 5 upstream of the three-way converter 6. The oxygen sensor 12 detects the oxygen concentration in the exhaust gas from the engine 1, which sharply changes its output characteristic at the point of stoichiometric air-fuel ratio.

Outputs from the air flow meter 7, the throttle sensor 9, the crankangle sensor 10, the water temperature sensor 11 and the oxygen sensor 12 are all fed to a control unit 20 which includes a microcomputer.

Figure 2:
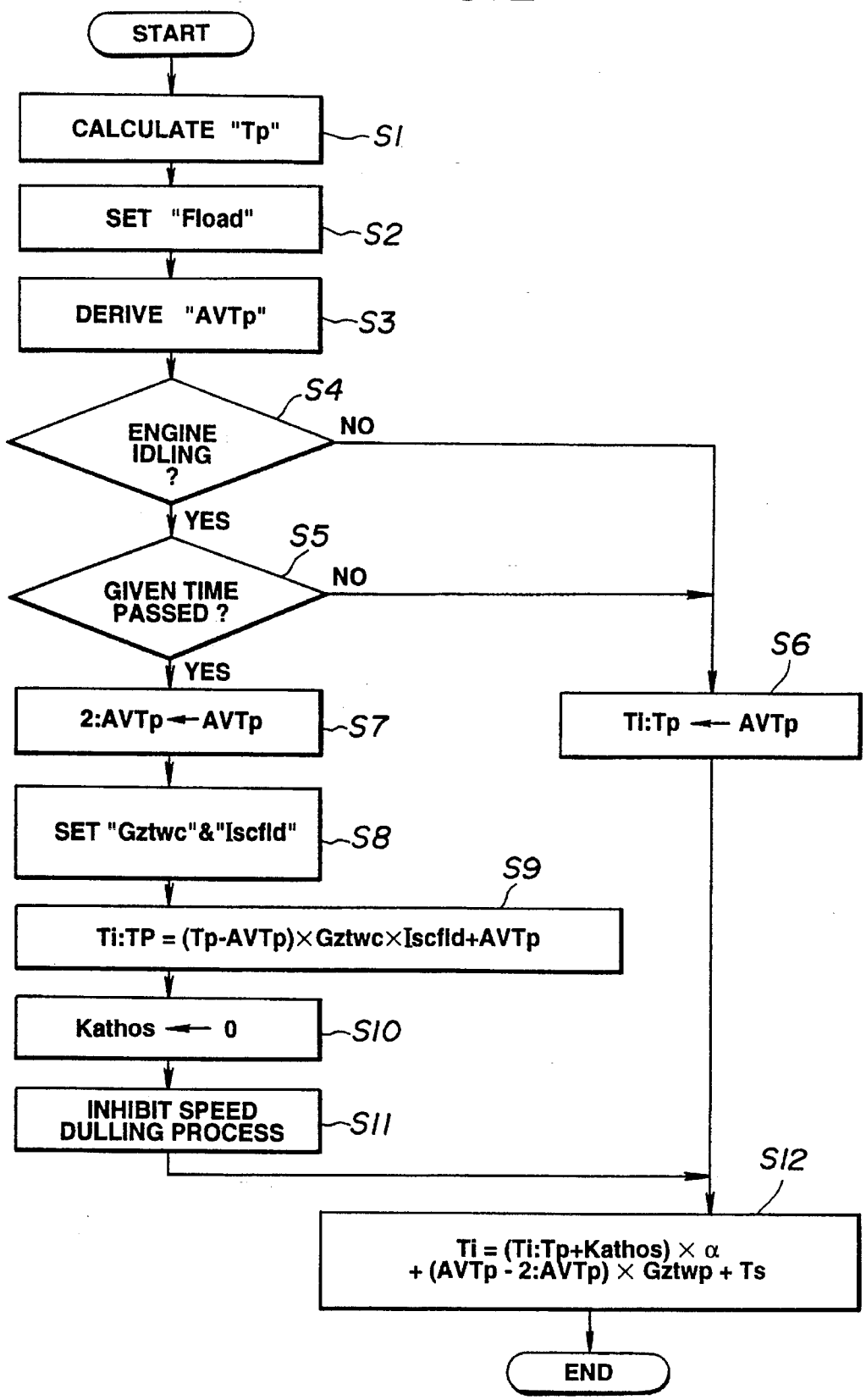
FIG. 2 is a flowchart showing program operation steps carried out in a computer employed in the system of the invention.

In the control unit 20, programmed operation steps as shown in the flowchart of FIG. 2 are carried out to determine a final fuel injection amount "Ti" fed to the engine 1 through the fuel injection valve 4. That is, at the intake stroke of each cylinder of the engine 1, the determined amount "Ti" of fuel is injected to the corresponding cylinder through the corresponding fuel injection valve 4.

The operation steps shown in the flowchart of FIG. 2 are carried out at given short intervals (for example, 10 msec).

At step S-1, a basic fuel injection amount "Tp" (more specifically, the pulse width corresponding to a basic amount of fuel to be injected) is derived on both the basis of the intake air amount "Qa" and the engine speed "Ne". At step S-2, on the basis of the engine speed "Ne", a weighting factor "$F_{load}$" for flattening the basic fuel injection amount "Tp" is derived. At step S-3, by using the following equation (1), a substantial fuel injection amount "AVTp" corresponding to the amount of air actually fed to each cylinder is derived.

$$AVTp = Tp \times F_{load} + AVTp-1 \times (1-F_{load}) \quad (1)$$

It is to be noted that the term "AVTp–1" is a substantial fuel injection amount "AVTp" which has been derived at the step S-3 in a previous execution of the operation flow.

At step S-4, based on the throttle open degree "TVO", a judgment is carried out as to whether the engine 1 is under idling or not.

If "No", that is, when the engine 1 is not under idling, the operation flow goes to step S-6 which will be described hereinafter.

If "Yes" at step S-4, that is, when the engine 1 is under idling, the operation flow goes to step S-5. At this step, a judgment is carried out as to whether a given time has passed after starting of the engine 1 or not. If "No", that is, when the given time has not passed after the engine starting, the operation flow goes to the step S-6. At this step S-6, the substantial fuel injection amount "AVTp" derived at the step S-3 is set as a tentative fuel injection amount "Ti:Tp".

After the step S-6, the operation flow goes to step S-12. At this step S-12, a final fuel injection amount "Ti" is calculated by using the following equation (2).

$$Ti = (Ti:Tp + Kathos) \times \alpha + (AVTp - 2:AVTp) \times Gztwp + Ts \quad (2)$$

It is to be noted that the term "2:AVTp" is a substantial fuel injection amount "AVTp" which has been derived at the step S-3 at the time prior to the present by the time for which two rotations of the engine 1 take place. Accordingly, the term "(AVTp–2:AVTp)" means a variation "ΔAVTp" of the substantial fuel injection amount "AVTp" in a time for which the two rotations of the engine 1 take place.

It is to be noted that the term "Gztwp" is a factor for determining an increasing gain, which is set in accordance with the temperature "Tw" of the engine cooling water.

It is to be noted that the term "Ts" means a fuel injection amount which is to be provided by the fuel injection valve 4 during its invalid injection period. The fuel injection amount "Ts" is set on the basis of the voltage of a battery by which the fuel injection valves 4 are powered.

It is to be noted that the term "Kathos" means a transient correction amount for correcting an error caused by a fuel deposited on the wall of the intake tube 3. As will be understood from the disclosure of Japanese First Provisional Publication 4-224255, the transient correction amount "Kathos" is set on the basis of the mean amount of fuel collected on the wall, which is derived for each operating condition of the vehicle.

It is further to be noted that the term "α" is an air-fuel ratio feedback correction factor. In fact, based on the output from the oxygen sensor 12, a judgment is carried out as to whether the exhaust gas is richer or leaner than the stoichiometric ratio. The correction factor "α" is set to bring the real air-fuel ratio toward the stoichiometric ratio.

The final fuel injection amount "Ti" derived at the step S-12 is updated every given period, and the final fuel injection amount "Ti" is read out every time the fuel injection is needed in accordance with the intake stroke of each cylinder. That is, every time a cylinder takes the intake stroke, the corresponding fuel injection valve 4 is fed with an instruction signal whose pulse width corresponds to the final fuel injection amount "Ti".

If "Yes" at step S-5, that is, when the given time has passed after the engine starting, the operation flow goes to step S-7. It is to be noted that under this engine idling condition, suppression of hunting is highly needed.

At the step S-7, the substantial fuel injection amount "AVTp" just derived at the step S-3 is set as a substitute for the term "2:AVTp" which has been used for deriving the final fuel injection amount "Ti". With this setting, as will be described hereinafter, even in the step S-12 which will take place later, the correction based on the variation "(AVTp–2:AVTp)" of the substantive fuel injection amount is not substantially carried out. That is, as will be described hereinafter, a correction is made to the final fuel injection amount "Ti" without being affected by the variation "(AVTp–2:AVTp)".

At step S-8, based on the temperature "Tw" of the cooling water detected by the temperature sensor 11, an increasing correction gain "Gztwc" for the substantial fuel injection amount "AVTp" and a correction factor "Iscfld" for an error caused by a fuel deposited on the wall of the intake tube 3 are set.

Then, the operation flow goes to step S-9. At this step, the following equation (3) is carried out to derive the tentative fuel injection amount "Ti:Tp".

$$Ti:Tp=(Tp-AVTp) \times Gztwc \times Iscfld + AVTp \qquad (3)$$

That is, for deriving the tentative amount "Ti:Tp", the difference (Tp–AVTp) between the basic fuel injection amount "Tp" derived from the intake air amount "Qa" and the substantial fuel injection amount "AVTp" derived by subjecting the basic fuel injection amount "Tp" to a weighting process is multiplied by the given correction terms "Gztwc×Iscfld" and added to the substantial fuel injection amount "AVTp".

When, under idling of the engine 1, the engine speed lowers and thus the basic fuel injection amount "Tp" is increased stepwise, a marked variation is produced between the basic fuel injection amount "Tp" and the substantial fuel injection amount "AVTp". However, due to employment of the step S-9, the marked variation is multiplied by the given correction terms and added to the substantial fuel injection amount "AVTp". With this, the tentative fuel injection amount "Ti:Tp" can be changed stepwisely. That is, the tentative amount "Ti:Tp" can be set to an intermediate degree between the basic amount "Tp" and the substantial amount "AVTp".

When the engine speed lowers under engine idling, the fuel injection based the tentative amount "Ti:Tp" is commenced. With this, sufficient torque can be instantly produced by the engine 1, and thus, the undesired hunting of the engine is suppressed or at least minimized.

It is to be noted that the correction based on the term "(AVTp–2:AVTp)" is of a type based on the variation of the substantial fuel injection amount "AVTp" which has been subjected to the weighting process. Thus, even in a case wherein the basic fuel injection amount "Tp" is raised stepwisely, the raising is dull, that is, quick response is not expected.

On the contrary, in the type wherein the substantial fuel injection amount "AVTp" is corrected on the basis of the variation between the basic fuel injection amount "Tp" and the substantial fuel injection amount "AVTp", increase of the variation between the basic amount "Tp" and the substantial amount "AVTp" due to occurrence of the stepwise change of the basic fuel injection amount "Tp" does not induce the above-mentioned dull result. That is, even if the variation between the amounts "Tp" and "AVTp" becomes great, the multiplication of the variation by the given correction terms "Gztwc×Iscfld" and the addition of the result to the "AVTp" permit the tentative fuel injection amount "Ti:Tp" to change stepwisely. Accordingly, while setting the fuel injection amount in accordance with the air amount actually fed to each cylinder, rapid recovering of torque is achieved and thus the undesired hunting of the engine is stopped rapidly.

At step S-10, the transient correction amount "Kathos" is set "0 (zero)". This is because in the step S-9 to derive the tentative amount "Ti:Tp", the correction to the error caused by the fuel deposited on the wall of the intake tube 3 has been carried out using the correction factor "Iscfld".

In a base construction wherein the engine speed "Ne" is subjected to a weighting process and the basic fuel injection amount "Tp" is derived on the basis of the weighted engine speed "Ne", it is desired to stop the weighting process on a particular case wherein the calculation of the step S-9 is to be executed. Accordingly, at step S-11, an engine speed dulling process is inhibited.

That is, in order to effectively suppress the hunting of the engine under idling, it is desired to quickly change the tentative amount "Ti:Tp" upon occurrence of change in the engine speed. For this reason, derivation of the tentative amount "Ti:Tp" is provided at the step S-9. However, if, due to usage of the engine speed dulling process, the basic fuel injection amount "Tp" is forced to change slowly upon occurrence of change in the engine speed, quick change of the tentative amount "Ti:Tp" at the change of engine speed is not obtained irrespective of the process of the step S-9.

After the step S-11, the operation flow goes to the step S-12. At this step, the final fuel injection amount "Ti" is calculated by using the afore-mentioned equation (2) and the tentative amount "Ti:Tp" obtained at the step S-9..

In the above-mentioned embodiment, as a means for detecting the quantity of state which is correlated with the amount of air actually fed to the cylinders, the air-flow meter 7 is used. However, in place of the air-flow meter 7, other means may be also used, which are, for example, a sensor for sensing the inclination angle of the throttle valve, a sensor for sensing the intake vacuum of the intake tube 3 and the like.

Furthermore, if desired, the weighting factor, the increasing gain and the fuel-deposit correction factor may be previously set for each cylinder to provide the cylinders with different final fuel injection amount "Ti".

As will be understood from the foregoing description, according to the present invention, in a fuel injection control system wherein the fuel injection amount fed to each cylinder corresponds to the amount of air actually fed to the cylinder, there is employed a measure in which the basic fuel injection amount is subjected to a flattening process. With this measure, quick change of fuel injection amount toward a desired amount is obtained upon occurrence of change of the engine speed. Thus, the undesired hunting of the engine under idling is effectively suppressed or at least minimized.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A fuel injection control system for a multicylinder internal combustion engine which has a plurality of fuel injection valves for respective cylinders, comprising:

first means for detecting an amount of air fed to each cylinder;

second means comprising a microprocessor for calculating a basic fuel injection amount at given intervals on the basis of the detected amount of air, for weighting said basic fuel injection amount at said given intervals to obtain a substantial fuel injection amount which corresponds to the amount of air actually fed to the cylinders, and for correcting said substantial fuel injection amount on the basis of a given rate of a variation between said basic fuel injection amount and said substantial fuel injection amount to thereby obtain a final fuel injection amount and to generate a corresponding fuel injection pulse signal; and fuel injection valves which operate to inject a controlled amount of fuel, corresponding to said fuel injection pulse signal, into each of the respective cylinders.

2. The fuel injection control system according to claim 1, wherein:

said second means performs said correction only when the engine is operating under an idling condition.

3. The fuel injection control system according to claim 2, wherein:

said second means, when said engine is under an operating condition other than the idling condition, functions to correct said substantial fuel injection amount on the basis of a variation of said substantial fuel injection amount within a given period to thereby obtain the final fuel injection amount.

4. The fuel injection control system according to claim 3, wherein:

said first means comprises an air flow sensor mounted on an intake tube of the engine to detect said amount of air; and an engine speed sensor for sensing a speed of rotation of the engine.

5. A fuel injection control system according to claim 4, wherein:

said second means calculates the basic fuel injection amount on the basis of amount of air detected by said air flow sensor and the engine speed detected by said engine speed sensor.

6. The fuel injection control system according to claim 5, wherein:

said second means obtains said substantial fuel injection amount (AVTp) in accordance with the relationship $$AVTp = Tp \times F_{load} + AVTp{-}1 \times (1 - F_{load})$$

wherein

Tp: a calculated basic fuel injection amount, $F_{load}$: weighting factor based on engine speed, and AVTp−1: a substantial fuel injection amount which has been derived at a previous operation execution.

7. The fuel injection control system according to claim 6, wherein:

said second means obtains said final fuel injection amount (Ti) in accordance with the relationship $$Ti = (Ti{:}Tp + Kathos) \times \alpha + (AVTp - 2{:}AVTp) \times Gztwp + Ts$$

wherein

Ti:Tp: is a tentative fuel injection amount,

Kathos: is a transient correction amount for correcting error caused by deposition of fuel on a wall of the intake tube, $\alpha$: is an air-fuel ratio feedback correction factor, 2:AVTp: is a substantial fuel injection amount which has been derived at the time prior to the present by a time required for two rotations of the engine to take place, Gztwp: is a factor for determining a gain based on a temperature of engine cooling water, and Ts: is a fuel injection amount to be provided by the fuel injection valve during an invalid injection period.

8. The fuel injection control system according to claim 7, wherein:

a tentative fuel injection amount (Ti:Tp) is obtained in accordance with the relationship $$Ti{:}Tp = (Tp - AVTp) \times Gztwc \times Iscfld + AVTp$$

wherein

Gztwc: is an increasing gain based on a temperature of the engine cooling water, and Iscfld: is a correction factor for correcting an error caused by deposition of fuel on a wall of the intake tube.

* * * * *